(12) United States Patent
Ames

(10) Patent No.: X9764
(45) Date of Patent: Jun. 25, 1836

(54) OVENS, REFLECTING

(76) Inventor: Benjamin Ames

Benjamin Ames, of Ithaca, State of New York,
Letters Patent.

The schedule referred to in these Letters Patent and making part of the same, containing a description in the words of the said Benjamin Ames himself of his "improvement in the Reflecting Oven and Boiler."

To all to whom these presents shall come.

Be it known that I Benjamin Ames of Ithaca in the County of Tompkins and State of New York, have invented a new and useful instrument, being a reflecting oven and boiler, and that the following is a full and exact description thereof The oven is made of sheet tin, or other material of bright surface in order to reflect the heat which is emitted from the pipe in the centre hereafter described, it may be of any size which may be desired a proper size for a family would be about two feet three inches square, and four and a half inches deep on the edge or outside the top and bottom are put on at an angle of forty five degrees or thereabouts extending in each direction about ten inches having square openings in the centre both of top and bottom of about eleven inches which are covered with sheet iron plates, through the centre of these plates is inserted a sheet iron pipe of five inches diameter fifteen inches and an half long. so as to extend the whole depth of the oven, with a small proportion above and below in order to prevent any smoke from escaping from the pipe into the oven while cooking. This pipe rests on a sheet iron strap under the oven, about four inches from the bottom of this pipe is inserted a grate on which to place the fuel which may be either charcoal, mineral coal, or small wood, under the bottom of this pipe is placed a pan to receive the ashes &c from the grate, this pan is
to be supported a small distance below the bottom
of the pipe in order to admit a current of air. On
the top of the pipe may be placed a receiver for boiler
of any size which may be desired made of sheet iron or any
other material, on which to place the boilers, pots or kettles which
are used in cooking or heating water into the side of this receiver
is inserted the pipe to carry off the smoke from the fire,
in which may be placed a damper to regulate the
heat. This pipe if either charcoal or mineral coal
is used may be for two and a half or three inches in
diameter, but if wood is used the pipe must be larger
across the bottom of the perpendicular part of the stove
are laid four iron straps or supporters made of sheet
or strap iron, with notches in the upper edges to sup-
port the rods on which are placed the pans or other
vessels containing the articles to be baked, which rods
are to be placed at the distance of about three inches
from each other On these rods and around the pipe
is placed a plate of sheet iron for the purpose of heating
flat irons which are set on this plate. a roller about
three inches high may be placed around the pipe leaving
a space of about half an inch in order to deaden the
heat near the pipe, two sides of the upper part are made
into doors hung upon hinges at the place of intersec-
-tion with the perpendicular sides this is to be placed
on legs of sheet iron or other suitable material of suf-
ficient length to make it of convenient height for use,
What I claim as my own invention and not
previously known in the above oven and boiler is the
principle of confining the heat by reflection and
the arrangement of the several parts for equal
-izing the heat and the receiver for the

United States Patent

Patent No.: X9764 boiling on the top of the pipe

Witnesses

Augustus Sherrill }
B. F. Halsey }

Benjamin Ames 415 ad

Ex.

Chf.